(12) United States Patent
Zai et al.

(10) Patent No.: US 11,999,242 B2
(45) Date of Patent: Jun. 4, 2024

(54) DRIVE SYSTEM FOR A HYBRID OR ELECTRIC VEHICLE

(71) Applicants: ELDOR CORPORATION S.P.A., Orsenigo (IT); TECNOMATIC S.P.A., Pescara (IT)

(72) Inventors: Luca Zai, Turin (IT); Pasquale Forte, Castiglione d'Orcia (IT); Ruggero Seccia, Turin (IT)

(73) Assignees: ELDOR CORPORATION S.p.A., Orsenigo (IT); TECNOMATIC S.p.A., Pescara (IT)

( * ) Notice: Subject to any disclaimer, the term of this patent is extended or adjusted under 35 U.S.C. 154(b) by 223 days.

(21) Appl. No.: 17/770,880

(22) PCT Filed: Oct. 23, 2020

(86) PCT No.: PCT/IB2020/059973
§ 371 (c)(1),
(2) Date: Apr. 21, 2022

(87) PCT Pub. No.: WO2021/079332
PCT Pub. Date: Apr. 29, 2021

(65) Prior Publication Data
US 2022/0410724 A1 Dec. 29, 2022

(30) Foreign Application Priority Data
Oct. 23, 2019 (IT) .................. 102019000019670

(51) Int. Cl.
*B60L 15/20* (2006.01)
*B60L 50/15* (2019.01)

(52) U.S. Cl.
CPC .......... *B60L 15/2045* (2013.01); *B60L 50/15* (2019.02); *B60L 2220/14* (2013.01);
(Continued)

(58) Field of Classification Search
CPC .. B60L 15/2045; B60L 50/15; B60L 2220/14; B60L 2220/56; B60L 2240/421; B60L 2240/423
See application file for complete search history.

(56) References Cited

U.S. PATENT DOCUMENTS 5,306,972 A 4/1994 Hokanson et al.
2015/0263660 A1 9/2015 Patrick et al.
(Continued)

FOREIGN PATENT DOCUMENTS

EP 2168830 A2 3/2010
EP 3435540 A1 1/2019
(Continued)

OTHER PUBLICATIONS

International Search Report and Written Opinion dated Mar. 25, 2021 from counterpart International Patent Application No. PCT/IB2020/059973.

*Primary Examiner* — Zoheb S Imtiaz
(74) *Attorney, Agent, or Firm* — SHUTTLEWORTH & INGERSOLL, PLC; Timothy J. Klima

(57) ABSTRACT

A drive system for a hybrid or electric vehicle includes an electrical energy source; an electric machine, a switching device linked to the electric machine and selectively switchable between a first configuration, and a second configuration, an adjusting device linked to the electric machine and configured to vary its operating parameters, and a control unit. The first electrical configuration includes a first number of conductors in series by phase supplying a first driving torque with a first knee speed and a first no-load operation speed. The second electrical configuration includes a second number of conductors in series by phase supplying a second driving torque, lower than the first driving torque, and a second knee speed higher than the first knee speed. A ratio (Continued)

Figure 1:
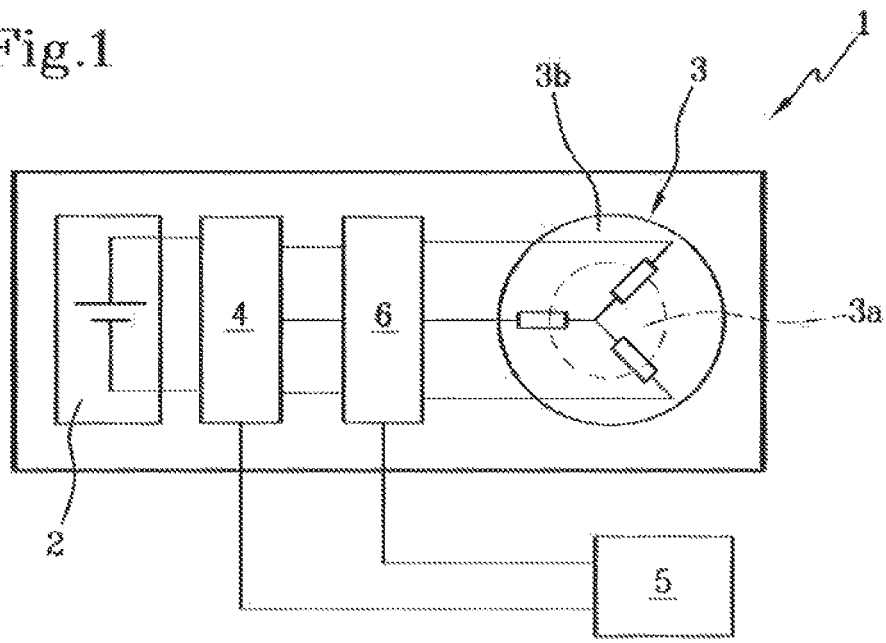

between the first no-load operation speed and the second knee speed is between 0.7 and 1.3.

10 Claims, 1 Drawing Sheet

(52) U.S. Cl.
CPC ..... *B60L 2220/56* (2013.01); *B60L 2240/421* (2013.01); *B60L 2240/423* (2013.01)

(56) References Cited

U.S. PATENT DOCUMENTS

| | | | |
|---|---|---|---|
| 2016/0056739 A1* | 2/2016 | Hashimoto | H02P 21/05 318/400.09 |
| 2016/0072424 A1* | 3/2016 | Yokozutsumi | H02P 27/085 318/503 |
| 2016/0141996 A1 | 5/2016 | Kim | |
| 2016/0204728 A1 | 7/2016 | Notohara et al. | |
| 2017/0151947 A1 | 6/2017 | Kim | |
| 2018/0175769 A1 | 6/2018 | Filipeti et al. | |

FOREIGN PATENT DOCUMENTS

| | | |
|---|---|---|
| JP | H06253594 A | 9/1994 |
| JP | H06292329 A | 10/1994 |
| WO | 2009070089 A1 | 6/2009 |

* cited by examiner

DRIVE SYSTEM FOR A HYBRID OR ELECTRIC VEHICLE

This application is the National Phase of International Application PCT/IB2020/059973 filed Oct. 23, 2020 which designated the U.S.

This application claims priority to Italian Patent Application No. 102019000019670 filed Oct. 23, 2019, which application is incorporated by reference herein.

This invention relates to a drive system for a hybrid or electric vehicle and a method for controlling the same.

This invention is, therefore, particularly applicable to the automotive sector and, more precisely, to the design and manufacture of electric or electric/endothermic hybrid propulsion vehicles.

In relation to this sector, the desire has long been felt to extend the efficiency range of the electric motor in order to allow its use even in the absence of a mechanical transmission, or, in any case, in the presence of a simplified mechanical transmission.

To date, some methods are known, which are suitable for traction applications and use a suitable subdivision of the stator winding in different sections that can be selectively combined with each other in order to vary the motor "configuration", thus being able to adapt it to the working conditions and extend its working range.

One such solution, perhaps the first, was studied by Eckart Nipp in his 1999 PhD thesis, which described a reconfigurable electric machine capable of achieving good performance in various operating conditions.

This solution, only illustrated on paper or with bench tests, has found limited application on the market, mainly due to its implementation/construction difficulties.

Nipp, in fact, proposes the coupling of a reconfiguration system to an electric motor designed so that the change in configuration occurs once the rotation speed reaches the value of the knee speed at maximum load of the existing (or starting) configuration, where the expression "knee speed" in this text is understood as defining the maximum speed at which the machine, in the starting configuration, can follow the characteristic curve at maximum constant torque.

In other words, the knee speed (or base speed) is the speed at which the machine's characteristic torque-speed curve changes from a constant torque condition to a decreasing torque condition.

Therefore, according to the prior art, given a starting configuration able to define a prefixed characteristic curve, the control unit of the reconfiguration system based on Nipp theory drives the machine so that, when the knee speed is reached (during acceleration), the stator windings are reconfigured passing from the starting configuration, generally at higher torque and lower speed, to a finishing configuration, generally at lower torque and higher speed (with the same power supply conditions: current and voltage).

Disadvantageously, this solution, while being particularly sound from the safety point of view, making it possible to avoid uncontrolled generator operation (UGO), has significant limits from the point of view of delivery fluidity as the driver experiences significant torque/power holes during acceleration.

The purpose of this invention is, therefore, to provide a drive system for a hybrid or electric vehicle that is able to overcome the drawbacks of the prior art described above.

In particular, the purpose of this invention is to provide a drive system for a hybrid or electric vehicle that are particularly high performance and, at the same time, very safe.

More precisely, the purpose of this invention is to provide a drive system for a hybrid or electric vehicle optimised for automotive applications and able to ensure continuity in power delivery and limit any torque holes as much as possible.

Said purposes are achieved with a drive system for a hybrid or electric vehicle having the features of one or more of the following claims.

In particular, said purposes are achieved with a drive system comprising an electrical energy source, an electric machine, an adjusting device (e.g. inverter) linked to the electric machine and a control unit.

The adjusting device is preferably an inverter and is configured to vary the operating parameters of the electric machine.

The electric machine is preferably of the synchronous type (magnets or reluctance) and is equipped with a rotor rotating around its own rotation axis and a stator containing a plurality of phases extending between their respective terminals. This electric machine is also reconfigurable.

Therefore, the drive system (or electric machine) comprises a switching device that is selectively switchable between a first configuration, wherein the stator phases are in a first electrical configuration, and a second configuration, wherein the stator phases are in a second electrical configuration.

The control unit is linked to the switching device and to the adjusting device and is configured to drive them according to the operating conditions of said vehicle.

Advantageously, in this way it is possible to vary the configuration of the electric machine and, therefore, its "efficiency range", with a simple and unique command imparted by the control unit.

It should be noted that, preferably, the term "electrical configuration" is used to define the wiring diagram for connecting the conductor bundles in series, i.e. of the individual phases, which, as the type of connection between the connector bundles changes, the characteristic curve of the electric machine changes, for example by increasing or decreasing the basic speed at the expense or to the advantage of the maximum driving torque (with the same voltage or current supply).

In this respect, in said first electrical configuration of the stator, the electric machine includes a first number of conductors in series by phase, able to supply a first driving torque and has a first knee speed (or first base speed) and a pre-set first no-load operation speed.

Preferably, in addition, in said second electrical configuration of the stator, the electric machine includes a second number of conductors in series by phase able to supply a second driving torque, lower than the first driving torque, and has a second knee speed (or second base speed) higher than the first knee speed.

According to one aspect of the invention, the ratio between the first no-load operation speed and said second knee speed ranges between 0.7 and 1.3.

According to an additional aspect of the invention, the control unit is configured to:

drive the adjusting device so as to control the electric machine in flux weakening mode when the rotation speed of said rotor is higher than said first knee speed;

bring the switching device from the first to the second configuration to reach a switching speed higher than said first knee speed and lower than said first no-load operation speed.

It should be noted that the term "flux weakening" is used in this text to define the type of electric machine driving in which, in order to increase the rotor speed beyond the knee value, and since the voltage (limit value) cannot be increased, the amplitude of the voltage limit circumferences is decreased and, therefore, the maximum torque with respect to the current used moves (in the plane ld, lq) at values such that a flux component is generated that opposes that produced by the permanent magnet.

This way, the configuration of the drive system is advantageous in optimizing power delivery during acceleration, minimizing "torque holes" between the first and second configuration, i.e. avoiding an abrupt transition from one configuration to another and the establishment of an uncontrolled generator operation that would compromise vehicle operation.

Preferably, the first and second configuration of the electric machine have (i.e. operate according to) a first characteristic curve and a second characteristic curve extending on a torque-speed plane.

The first characteristic curve preferably intersects the second characteristic curve at an intersection speed.

It should be noted that, in this respect, the characteristic curves could be defined only by the characteristics of the electric machine or imposed by a maximum mechanical power that the application (or rated mechanical power) needs from the electric machine.

The control unit is preferably configured to bring (switch) the electric machine from the first to the second configuration to alternatively reach a switching speed:

comprised between said intersection speed and said first no-load operation speed, if the first no-load operation speed is greater than the intersection speed;

lower than said first no-load operation speed, if the first no-load operation speed is lower than the intersection speed.

In this way, it is, advantageously, possible to make the most of the flux weakening of the initial (first) configuration, ensuring, where possible, continuity of torque/power delivery.

In the same way, it is ensured that the safety limit of the machine in the first configuration (first no-load operation speed) is not exceeded, thus preventing dangerous conditions for the structure of the electric machine or the driver from occurring.

In order to ensure maximum continuity of delivery, and therefore maximum driving comfort, if the second knee speed is lower than the first no-load operation speed, the switching speed ranges between the intersection speed and the second knee speed; more preferably it corresponds to the intersection speed so as to avoid any torque hole (unless there is a transient hole).

Preferably, moreover, in order to maximise the performance of the drive system, the Applicant has found that some of the construction parameters of the electric machine must fall within predetermined intervals, obtained both experimentally and analytically.

Preferably, therefore, the first no-load operation speed is at least 1.5 times the first knee speed.

Preferably, the ratio between said first and said second number of conductors in series by phase ranges between 1 and 5, preferably between 1.5 and 3.5.

Preferably, the electric machine has aphysical anisotropy of the machine ranging between 1 and 11, preferably between 3 and 7.

Advantageously, these parameters enable the machine to operate in an optimal operating zone to enable the reconfiguration of the stator windings in an equally safe and efficient way.

Figure 2:
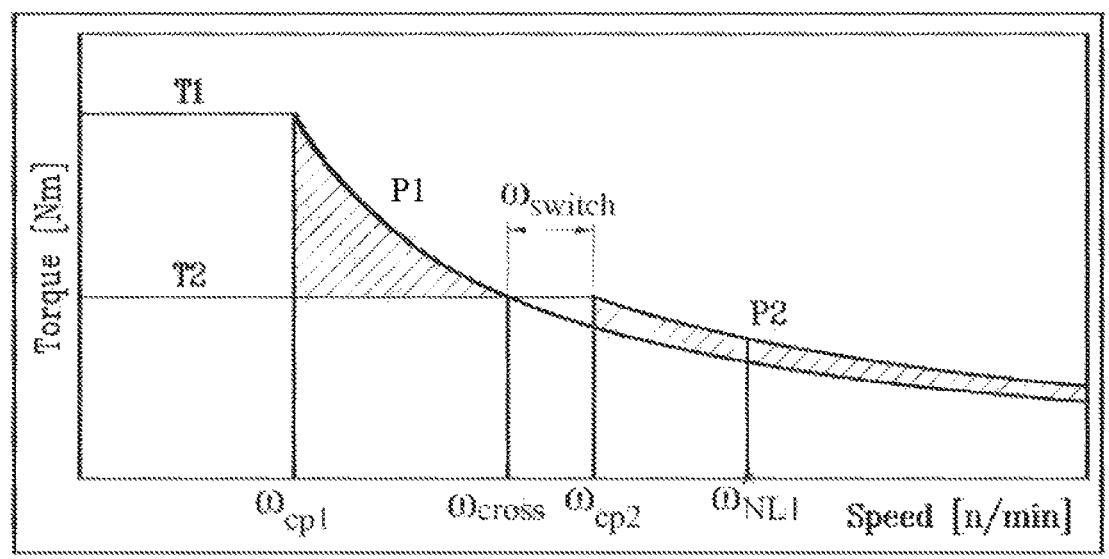

Other characteristics, together with the related technical benefits, will be clearer from the following illustrative, and therefore non-limiting, description of a preferred, and thus non-exclusive, embodiment of a drive system for a hybrid or electric vehicle according to what is illustrated in the attached drawings, wherein:

FIG. 1 schematically shows a drive system according to this invention;

FIG. 2 shows the characteristic curves of the system in FIG. 1 in an operating condition.

With reference to the appended figures, the reference number 1 indicates a drive system for a hybrid or electric vehicle according to this invention.

The drive system 1 is therefore a set of components that in cascade is able to generate a power/torque to be supplied to the wheels of a vehicle.

This system 1 can be completely electric or electric/endothermic hybrid.

This invention, in any case, refers to the "electric branch" of the drive system 1, which therefore comprises an electrical energy 2 source, an electric machine 3, an adjusting device 4 (e.g. an inverter) linked to the electric machine 3 and a control unit 5.

The electrical energy source 2, not illustrated in detail here, is preferably defined by a battery pack. Alternatively, in any case, it can involve using sources of another kind, such as, for example, fuel-cells, generators, solid-state batteries or other equivalent (or better) technologies.

The electric machine 3 is preferably of the synchronous type (magnets or reluctance) and is equipped with a rotor 3a rotating around its own rotation axis and a stator 3b containing a plurality of phases extending between their respective terminals.

Each phase is, therefore, defined by a pre-fixed number of conductor bundles in series conveniently connected to each other.

The phases can be of various kinds, but preferably are defined by bar conductors conveniently arranged in hollows made in a stator 3b casing and electrically connected to each other at at least one free end.

The electric machine 3 is, therefore, of the multiphase type, i.e. comprising a number of phases ranging from two and increasing depending on the type or application.

In the preferred embodiment, in any case, the electric machine 3 is defined by a three-phase synchronous motor.

In the preferred embodiment, the electric machine has a physical anisotropy of the machine ranging between 1 and 11, more preferably between 3 and 7.

The adjusting device 4 is preferably an inverter (or similar device) and is configured to vary the operating parameters of the electric machine.

According to one aspect of the invention, the phases (or phase fractions) can be connected together in a suitable way in order to change the operating configuration of the electric machine 3.

In other words, the electric machine 3 is preferably of the reconfigurable kind.

In this respect, therefore, there should be a switching device 6 linked to the electric machine 3 (in particular, to the stator 3b) and selectively switchable between a first configuration, wherein the stator phases are in a first electrical configuration, and a second configuration, wherein the stator phases are in a second electrical configuration.

Advantageously, in this way it is possible to vary the configuration of the electric machine 3 and, therefore, its "efficiency range", with a simple and unique command imparted by the control unit 5.

It should be noted that, preferably, the term "electrical configuration" is used to define the wiring diagram for connecting the conductor bundles in series, i.e. of the individual phases, which, as the type of connection between the conductor bundles changes, the characteristic curve of the electric machine changes, for example by increasing or decreasing the basic speed at the expense or to the advantage of the driving torque.

The Applicant has recently developed its own switching device, protected by the Italian patent applications 102019000004667 and 102019000011655.

However, other switching devices could be used in the drive system 1 in accordance with the invention, both of the mechanical kind and of another kind, such as, for example, semi-conductor or relay.

As far as the subject of this invention is concerned, in fact, it is sufficient that the stator 3b of the electric machine 3 has a plurality of reconfigurable phases to which any switching device 6 capable of modifying its electrical configuration is linked.

The control unit 5 is, therefore, linked both to the switching device 6 and to the adjusting device 4 and is configured to drive them according to the operating conditions of said vehicle.

The electric machine 3 is, thus, selectively configurable in at least one first and one second electrical configuration, respectively defined by the first and the second configuration of the switching device 6.

There could, preferably, also be more configurations, always with the purpose of increasing the rotation speed or softening the torque supply in the transition between two configurations. In the preferred embodiment, the electric machine 3 is shaped so as to be arranged in at least one third configuration that is additional to the first two.

Preferably, but not exclusively, the first and the second (and any third) electrical configuration are selected from the following list:
a delta-series configuration,
a delta-parallel configuration,
a star-series configuration,
a star-parallel configuration.

In the first electrical configuration of the stator 3b, the electric machine includes a first number of conductors in series by phase, able to supply a first (maximum) driving torque T1 and has a first knee speed $\omega_{cp1}$ and a pre-set first no-load operation speed.

As mentioned above, the term "knee speed" in this text is to be understood as defining the maximum speed at which the machine, in its respective configuration, can follow its own constant torque characteristic curve.

In other words, the knee speed (or base speed) is the speed at which the characteristic torque-speed curve of the machine goes from a constant torque condition to a decreasing torque condition (at constant mechanical power).

In this respect, in this first configuration, the electric machine has a first characteristic curve extending on a torque-speed plane with constant torque equal to said first driving torque T1 for speed values lower than or equal to said first knee speed $\omega_{cp1}$ and with constant power equal to a first maximum deliverable power P1 for speeds higher than said first knee speed $\omega_{cp1}$.

In other words, the first characteristic curve has a first section, with constant torque, and a second section, with constant power.

Similarly, in the second electrical configuration of the stator 3b, the electric machine 3 includes a second number of conductors in series by phase able to supply a second (maximum) driving torque T2, lower than the first driving torque T1, and has a second knee speed $\omega_{cp2}$ higher than the first knee speed $\omega_{cp1}$ (as well as a second no-load operation speed, not illustrated).

In said second configuration, the electric machine 3 has, therefore, a second characteristic curve extending on a torque-speed plane with constant torque equal to said second driving torque T2 for speed values lower than or equal to said second knee speed and with constant power equal to a second maximum deliverable power P2 for speeds higher than said second knee speed.

In other words, the second characteristic curve has a first section, with constant torque, and a second section, with constant power.

It should be noted that, preferably, the ratio between said first and said second number of conductors in series by phase ranges between 1 and 5, preferably between 1.5 and 3.5.

In addition, the first characteristic curve preferably intersects said second characteristic curve at an intersection speed $\omega_{cross}$.

It should be noted that, in this respect, the characteristic curves could be defined only by the characteristics of the electric machine or in part imposed by a maximum mechanical power that the application (or rated mechanical power) needs from the electric machine.

In other words, if the maximum power curve "cuts" the first or the second characteristic curve at speeds lower than the first $\omega_{cp1}$ or the second knee speed $\omega_{cp2}$ (i.e. in the constant torque section), the constant power section of the curve could correspond to the same maximum power curve.

Advantageously, this facilitates the implementation of a control strategy aimed at providing a continuous supply of torque.

With reference to the preferred embodiment, the third electrical configuration of the phases, therefore, includes a third number of conductors in series by phase, capable of providing a third driving torque, lower than the second driving torque T2, and has a third knee speed higher than the second knee speed $\omega_{cp2}$.

Also in said third configuration, the electric machine 3 has a respective third characteristic curve (not illustrated) extending on a torque-speed plane with constant torque equal to said third driving torque for speed values lower than said third knee speed and with constant power equal to a third maximum deliverable power for speeds higher than said third knee speed.

Preferably, the second characteristic curve also intersects said third characteristic curve at an intersection speed (not shown).

According to an additional aspect of this invention, the control unit 5 is configured to:
drive the adjusting device 4 so as to control the electric machine in flux weakening mode when the rotation speed of said rotor 3a is higher than said first knee speed $\omega_{cp1}$;
bring the switching device from the first to the second configuration to reach a switching speed $\omega_{switch}$ higher than said first knee speed $\omega_{cp1}$ and lower than said first no-load operation speed $\omega_{NL1}$.

It should be noted that the term "flux weakening" in this text is to be understood as defining the control methodology for depleting the field that makes it possible to increase the operational speed of the motor at the expense of the mechanical torque.

In other words, in order to increase the rotor speed beyond the knee value, since the voltage (limit value) cannot be increased, the amplitude of the voltage limit circumferences is decreased and therefore the maximum torque with respect to the current used moves (in the plane ld, lq) at values such that a flux component is generated that opposes that produced by the permanent magnet.

In this way, it is possible to make the most of the driving in the first configuration, bringing the speed and torque at the time of switching to values compatible with the second configuration, avoiding torque holes but, at the same time, avoiding risks to the safety of the electric machine 3 or the vehicle.

In this respect, it should be noted that the first no-load operation speed $\omega_{NL1}$ is preferably equal to at least 1.5 times the first knee speed $\omega_{cp1}$, more preferably at least 2 times the first knee speed $\omega_{cp1}$.

Advantageously, this makes it possible to have sufficient "space" to safely exploit the driving in flux weakening of the first configuration.

In addition, the ratio between the first no-load operation speed $\omega_{NL1}$ and said second knee speed $\omega_{cp2}$ preferably ranges between 0.7 and 1.3.

Advantageously, the fact that the electric machine is designed so that the second knee speed $\omega_{cp2}$ falls close to the first no-load operation speed $\omega_{NL1}$ ensures the maximum exploitation of the first configuration and, therefore, maximum torque supply continuity.

It should be noted that the interval: 0.7-1.3 is to be considered optimal in that it takes into consideration the changes that the ratio $\omega_{NL1}/\omega_{cp2}$ undergoes as a function of the magnet temperatures, thus making the operation of the electric machine optimal, irrespective of this parameter.

In any case, it should be noted that, preferably, for magnet temperatures that can be reached at full speed (e.g. greater than 120° C.), the second knee speed $\omega_{cp2}$ is lower than the first no-load operation speed $\omega_{NL1}$ (i.e. $\omega_{NL1}/\omega_{cp2}$ ranging between 1 and 1.3).

In this respect, preferably, the switching speed $\omega_{switch}$ being:
  comprised between said intersection speed $W_{cross}$ and said first no-load operation speed $\omega_{NL1}$, if the first no-load operation speed $\omega_{NL1}$ is greater than the intersection speed $\omega_{cross}$;
  lower than said first no-load operation speed $\omega_{NL1}$, if the first no-load operation speed $\omega_{NL1}$ is lower than the intersection speed $\omega_{cross}$.

It should be noted that, when the second knee speed $\omega_{cp2}$ and the intersection speed $\omega_{cross}$ are lower than the first no-load operation speed $\omega_{NL1}$, the switching speed $\omega_{switch}$ ranges between said intersection speed $\omega_{cross}$ and said second knee speed $\omega_{cp2}$.

More preferably, the switching speed $\omega_{switch}$ falls around the second knee speed $\omega_{cp2}$, preferably corresponding to the intersection speed $\omega_{cross}$, in order to avoid torque holes.

It should be noted that, in the preferred, higher performance embodiment, the ratio between the intersection speed $\omega_{cross}$ and the second knee speed $\omega_{cp2}$ ranges between 0.7 and 1, so as to maximise the continuity of the supply of power/torque, making the driver's experience of driving comfortable.

More preferably, the second knee speed ($\omega_{cp2}$) comes from the following relationship (to be considered as a single quantity, i.e. in a per-unit system, based on voltage):

$$\omega_{cp2} = \frac{1}{\sqrt{\left(\frac{\xi * L_d * i_s * \sin(\gamma)}{n_t^2}\right)^2 + \left(\frac{L_d}{n_t^2} * i_s * \cos(\gamma) + \frac{\lambda_m}{n_t}\right)^2}}$$

wherein:
$\xi$ is the machine anisotropy;
$L_d$ is the direct reluctance on the d-axis;
$n_t$ is the ratio between said first and said second number of conductors in series per phase;
$\gamma$ is the current angle along the maximum torque per Ampére curve;
$\lambda m$ is the magnetic flux;
$i_s$ is the peak current of the line Advantageously, this relationship makes it possible to correlate the second knee speed $\omega_{cp2}$ with the "transformation ratio" $n_t$, i.e. the ratio between said first and said second number of conductors in series by phase, as well as with the machine parameters such as inductance, anisotropy, and magnetic flux, thus optimizing the machine characteristics according to the variable configuration application.

In this respect, it should be noted that:
synchronous magnet machines are usually designed by determining the amount of magnets $\lambda m$ depending on the number of coils;
the following relationship exists between the first no-load operation speed $\omega_{NL1}$ and the magnetic flux (i.e. the amount of magnets), $$\omega_{NL,1} = \frac{V_{BATT}}{\lambda_m * \sqrt{3}}$$

which brought into a single system based on voltage (per unit), results in:

$$\omega_{NL,1} = \frac{1}{\lambda_m * \sqrt{3}}$$

This relationship therefore shows the correlation between the first no-load operation speed and the second knee speed, enabling the physical characteristics of the machine to be optimised for the desired application.

Thanks to the drive system according to this invention, however, it is possible to implement a reconfigurable electric machine 3 control method in which the switching between each configuration is carried out following a preliminary "flux weakening driving" section, at a switching speed $\omega_{switch}$ ranging between an intersection speed between the characteristic curves of the two configurations involved and the no-load operation speed of the starting speed, preferably at an intersection speed which, thanks to the design of the electric machine 3, falls near the knee speed of the arrival configuration and below the no-load operation speed.

The invention achieves its intended purposes and significant advantages are thus obtained.

In fact, thanks to this structure of the electric machine it is possible to overcome the safety problems identified in the prior art and fully exploit the potential of the electric motor, bringing its performance closer to a drive system with automatic transmission with continuous speed variation (i.e. without torque holes).

The invention claimed is:
1. A drive system for a hybrid or electric vehicle, comprising:
   an electrical energy source;
   an electric machine equipped with a rotor rotating around a rotation axis and a stator containing a plurality of phases extending between respective terminals;

a switching device linked to the electric machine and selectively switchable between a first configuration, wherein the phases are in a first electrical configuration, and a second configuration, wherein the phases are in a second electrical configuration;

an adjusting device linked to the electric machine and configured to vary operating parameters of the electric vehicle;

a control unit linked to said switching device and to said adjusting device and configured to drive said switching device and said adjusting device according to the operating conditions of said electric vehicle;

wherein, in said first configuration, the electric machine includes a first number of conductors in series by phase, configured to supply a first driving torque and having a first knee speed and a pre-set first no-load operation speed; wherein, in said second configuration, the electric machine includes a second number of conductors in series by phase, configured to supply a second driving torque, lower than the first driving torque, and having a second knee speed higher than the first knee speed; wherein a ratio between said first no-load operation speed; and said second knee speed ($\omega_{cp2}$) ranges between 0.7 and 1.3;

wherein said control unit is configured to drive the adjusting device to control the electric machine in a flux weakening mode when a rotation speed of said rotor is higher than said first knee speed;

wherein said control unit is configured to bring the switching device from the first configuration to the second configuration to reach a switching speed higher than said first knee speed; and lower than said first no-load operation speed, wherein:

said first configuration has a first characteristic curve extending on a torque-speed plane with a constant torque equal to said first driving torque for speed values lower than or equal to said first knee speed and with constant power equal to a first maximum deliverable power for speeds higher than said first knee speed;

said second configuration has a second characteristic curve extending on a torque-speed plane with constant torque equal to said second driving torque for speed values lower than or equal to said second knee speed ($\omega_{cp2}$) and with constant power equal to a second maximum deliverable power for speeds higher than said second knee speed ($\omega_{cp2}$), wherein said first characteristic curve intersects said second characteristic curve at an intersection speed;

a ratio between the intersection speed; and the second knee speed ranges between 0.7 and 1;

said first no-load operation speed, is equal to at least 1.5 times the first knee speed;

a ratio between said first and said second number of conductors in series by phase ranges between 1 and 5;

wherein a value of said second knee speed ($\omega_{cp2}$) results from the following relationship:

$$\omega_{cp2} = \frac{1}{\sqrt{\left(\frac{\xi * L_d * i_s * \sin(\gamma)}{n_t^2}\right)^2 + \left(\frac{L_d}{n_t^2} * i_s * \cos(\gamma) + \frac{\lambda_m}{n_t}\right)^2}}$$

wherein:
 $\xi$ is the machine anisotropy;
 $L_d$ is the direct reluctance on a d-axis;
 $n_t$ is the ratio between said first and said second number of conductors in series by phase;
 $\gamma$ is a current angle along a maximum torque per an Ampére curve;
 $\lambda_m$ is the magnetic flux;
 $i_s$ is a peak current of a line.

2. The drive system according to claim 1, wherein said switching speed being comprised between said intersection speed and said first no-load operation speed (WNL1), if the first no-load operation speed is greater than the intersection speed.

3. The drive system according to claim 1 or 2, wherein said switching speed is comprised between said intersection speed and said second knee speed, if the second knee speed is lower than the first no-load operation speed.

4. The drive system according to claim 3, wherein, if the intersection speed is lower than the first no-load operation speed, said switching speed corresponds to the intersection speed to avoid torque holes.

5. The drive system according to claim 1, wherein for magnet temperatures above 120° C., the second knee speed ($\omega_{cp2}$) is lower than the first no-load operation speed.

6. The drive system according to claim 1, wherein:
 the switching device is selectively switchable to a third configuration, wherein the phases are in a third electrical configuration which includes a third number of conductors in series by phase, configured to provide a third driving torque, lower than the second driving torque, and having a third knee speed higher than the second knee speed ($\omega_{cp2}$);
 said second configuration, includes a second no-load operation speed, and a ratio between said second no-load operation speed and said third knee speed ranges between 0.7 and 1.3;
 said control unit is configured to move the switching device from the second configuration to the third configuration when a second switching speed that is higher than said second knee speed ($\omega_{cp2}$) and lower than said second no-load operation speed is reached.

7. The drive system according to claim 1, wherein the first, second, and third configurations are selected from the following configurations:
 a delta-series configuration,
 a delta-parallel configuration,
 a star-series configuration,
 a star-parallel configuration.

8. The drive system according to claim 1, wherein said electric machine has a physical anisotropy ranging between 1 and 11.

9. The drive system according to claim 1, wherein the ratio between said first and said second number of conductors in series by phase ranges between 1.5 and 3.5.

10. The drive system according to claim 1, wherein said electric machine has a physical anisotropy ranging between 3 and 7.

* * * * *